United States Patent [19]
Akeel

[11] Patent Number: 5,526,700
[45] Date of Patent: Jun. 18, 1996

[54] SIX COMPONENT FORCE GAGE

[76] Inventor: Hadi A. Akeel, 3010 Quail Ridge Cir., Rochester Hills, Mich. 48309

[21] Appl. No.: 536,094

[22] Filed: Sep. 29, 1995

[51] Int. Cl.⁶ ........................................................ G01L 3/00
[52] U.S. Cl. ................................. 73/862.043; 73/862.042
[58] Field of Search ........................ 73/862.041, 862.042, 73/862.043, 862.044, 862.629, 862.631, 862.634, 754; 338/5

[56] References Cited

U.S. PATENT DOCUMENTS

| | | | |
|---|---|---|---|
| 3,939,704 | 2/1976 | Zipin | 73/862.043 X |
| 4,483,203 | 11/1984 | Capper | 73/862.044 X |
| 4,793,194 | 12/1988 | Wilner | 73/862.67 |
| 4,808,336 | 2/1989 | Rubner et al. | 252/300 |
| 4,841,272 | 6/1989 | Yamagishi et al. | 338/2 |
| 5,063,788 | 11/1991 | Ch'hayder et al. | 73/862.043 |
| 5,144,841 | 9/1992 | Brouwers et al. | 73/706 |
| 5,188,983 | 2/1993 | Guckel et al. | 437/209 |
| 5,227,260 | 7/1993 | Kobayashi | 338/2 |
| 5,231,301 | 7/1993 | Peterson et al. | 257/419 |
| 5,242,863 | 9/1993 | Xiang Zhen | 437/228 |
| 5,263,375 | 11/1993 | Okada | 73/862.042 |
| 5,295,399 | 3/1994 | Grant et al. | 73/862.043 |
| 5,297,438 | 3/1994 | Alles et al. | 73/727 |
| 5,315,882 | 5/1994 | Meyer et al. | 73/862.042 X |
| 5,369,594 | 11/1994 | Mastrangelo et al. | 361/283.4 |
| 5,375,034 | 12/1994 | Foyt et al. | 361/283 |

Primary Examiner—Kenneth A. Wieder
Assistant Examiner—Elizabeth L. Dougherty
Attorney, Agent, or Firm—Robert Samuel Smith

[57] ABSTRACT

A force gage for measuring force and moment between two bodies along orthogonal axes (x,y and z) including a semiconductor substrate carrying on its surface a plurality of piezoresistors supported by a structure attached to the two bodies that transforms the force and moment into deformation components applied in the plane of the substrate surface there enabling the sensors to be fabricated economically en masse using IC manufacturing techniques.

23 Claims, 4 Drawing Sheets

5,526,700

1

SIX COMPONENT FORCE GAGE

FIELD OF THE INVENTION

This invention relates to gages for measuring force and especially to a gage having an array of strain sensors that can detect force and/or moment applied in an arbitrary direction.

BACKGROUND AND INFORMATION DISCLOSURE

Several types of sensors including resistive, capacitive and magnetic are used to measure force and moments. The earliest resistance sensors were thin strands of wire having ends attached to an object subject to strain. As the wire was stretched, measured change of electrical resistance of the wire indicated strain in the object. The "capacitive" sensor comprises a diaphragm being one electrode of a capacitor whose capacitance varies in proportion to pressure applied to the diaphragm. Semiconductor technology has been adapted to provide far more sensitive sensors based on both resistance variation and capacitance variation. The ability to manufacture these devices using integrated circuit techniques has increased the variety of applications of force sensors on a broad industrial front.

Wilner U.S. Pat. No. 4,793,194 discloses a strain sensitive element including an n-type silicon substrate with grooves defining two islands and a frame wherein the grooves form a relatively flexible hinge connection between the islands and frame. A pair of strain ensors and a pair of conductors bridge across the groove and connect the islands and frame. All parts are integrally formed by an etching and diffusion process. The diffusion process with Boron converts the bridges to p-type silicon rendering them strain sensitive.

Yamagishi et al U.S. Pat. No. 4,841,272 discloses a strain gage comprising an n-doped Si substrate with Ge atoms diffused therein to reduce temperature coefficient.

Guckel et al U.S. Pat. No. 5,188,983 discloses a resonating beam of polysilicon which is piezoresistive. Resonant vibrations are induced by a variety of ways such as by capacitive induction. The beam is formed by depositing the beam on a sacrificial layer that has been formed on a substrate then etching away the artificial layer.

Peterson et al U.S. Pat. No. 5,231,301 discloses a sensor comprising an n type semiconductor substrate having a p type piezoresistor bridge over a flexible region and a metallic guard shield over laying the piezoresistor and electrically connected to the n-doped substrate such as to prevent charge buildup.

Techniques have been disclosed for forming a sensor depending on capacitance variation of a semiconductor diaphragm facing a substrate and enclosing a chamber.

For example, Mastrangelo U.S. Pat. No. 5,369,544 discloses a silicon on-insulator capacitive sensor formed by surface machining in which a flexible silicon diaphragm forms a sealed compartment with a semiconductor substrate.

Foyt et al U.S. Pat. No. 5,375,034 discloses an ion milling technique for depositing a glass spacer to form a capacitive sensor.

Xiang-Zheng et al U.S. Pat. No. 5,242,863 discloses a method for producing a piezoresistive diaphragm enclosing a chamber over a silicon substrate.

For some applications, there is a requirement for an arrangement of more than one sensor such as for measuring and correlating strain in various locations of an object.

For example, U.S. Pat. No. 5,227,760 discloses a strain gage comprising four gages connected as a Wheatstone bridge with resistance means for adjusting the offset voltage of the bridge.

Braouwers et al U.S. Pat. No. 5,144,841 discloses a hollow bolt with a piezoresistive element encapsulated within the the hollow bolt.

Discovery of materials other than semiconductors and having piezo resistive properties have been disclosed.

Alles U.S. Pat. No. 5,297,438 discloses a ferroelectric piezoresistive compound.

Rubner et al U.S. Pat. No. 4,808,336 discloses a piezo resistive blend of a doped acetylene polymer and an elastomer.

Some situations require a gage which is capable of indicating force or moment applied in any one of a number of directions. According to present art, such gages require independent bonding of a plurality of strain sensors, each arranged to respond to any one of the directions of applied force. The sensors are typically arranged as a three dimensional array which are more expensive to construct than the device of the present invention.

Sensors having a silicon based structure can be manufactured only on a micro scale and have minute force bearing capability; hence they can be used only at the scale of other 'silicon based micro-machined components and assemblies. Such sensors are also inherently built as two dimensional planar components, sensitive to forces either normal to or aligned with the structural plane. Therefore, measurements are usually limited to three force components such as $F_z$, normal to the plane of the sensor and its moments Mx and My or $F_x$, $F_y$, and their moment $M_z$. These forces and moments are generally too small to be humanly perceptible.

OBJECTS

It is an object of this invention to provide a gage capable of sensing force and moment in three orthogonal directions.

It is another object to provide a structure for a multi-component force gage having all its sensory elements located on a planar surface.

It is another object to apply a method for manufacturing which is less expensive than methods of the present art of assembling a gage having a plurality of gages.

It is another object that the miniature gage of this invention be capable of bearing and sensing forces of humanly perceptible magnitudes which is orders of magnitude larger than 'silicon based sensors of the prior art.

SUMMARY

This invention provides a gage capable of sensing forces and moments in three orthogonal directions wherein all sensing elements are mounted on a single plane for ease of assembling and mounting. The sensors and electronics may all be formed on a single silicon substrate.

In one embodiment, the structure has a central column with radial arms whose free ends are attached to terminations on the sensors. Some ends of the sensors abut a support frame that surrounds the central column and the remaining ends of the sensors abut the free end of the central column. The central column is anchored to a first body and the surrounding frame is anchored a second body such that the forces and moments to be measured are applied by one body forced against the other body. Both sensing elements and signal processing electronics are formed on one plane of the

THE DRAWINGS

DESCRIPTION OF A PREFERRED EMBODIMENT

Figure 1:
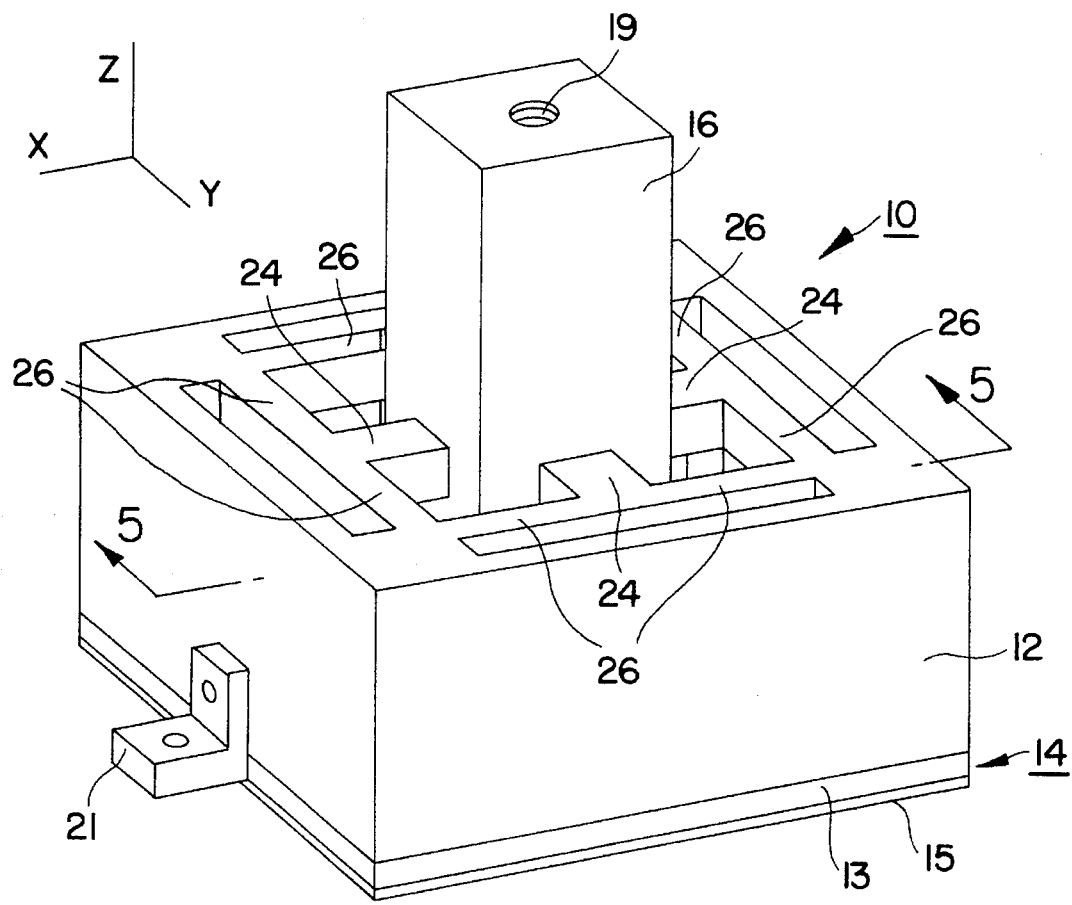
FIG. 1 is a perspective view of the assembled invention.

Turning now to a discussion of the drawings, FIG. 1 is a perspective view of the six component force gage 10 of this invention. The gage is used to measure force components between two bodies (bodies not shown). In the embodiment of FIG. 1, one body is attached to a central column 16 such as by a bolt in threaded hole 19 and the second body is bolted to a flange 21 on an outside frame of the gage 10.

Figure 2:
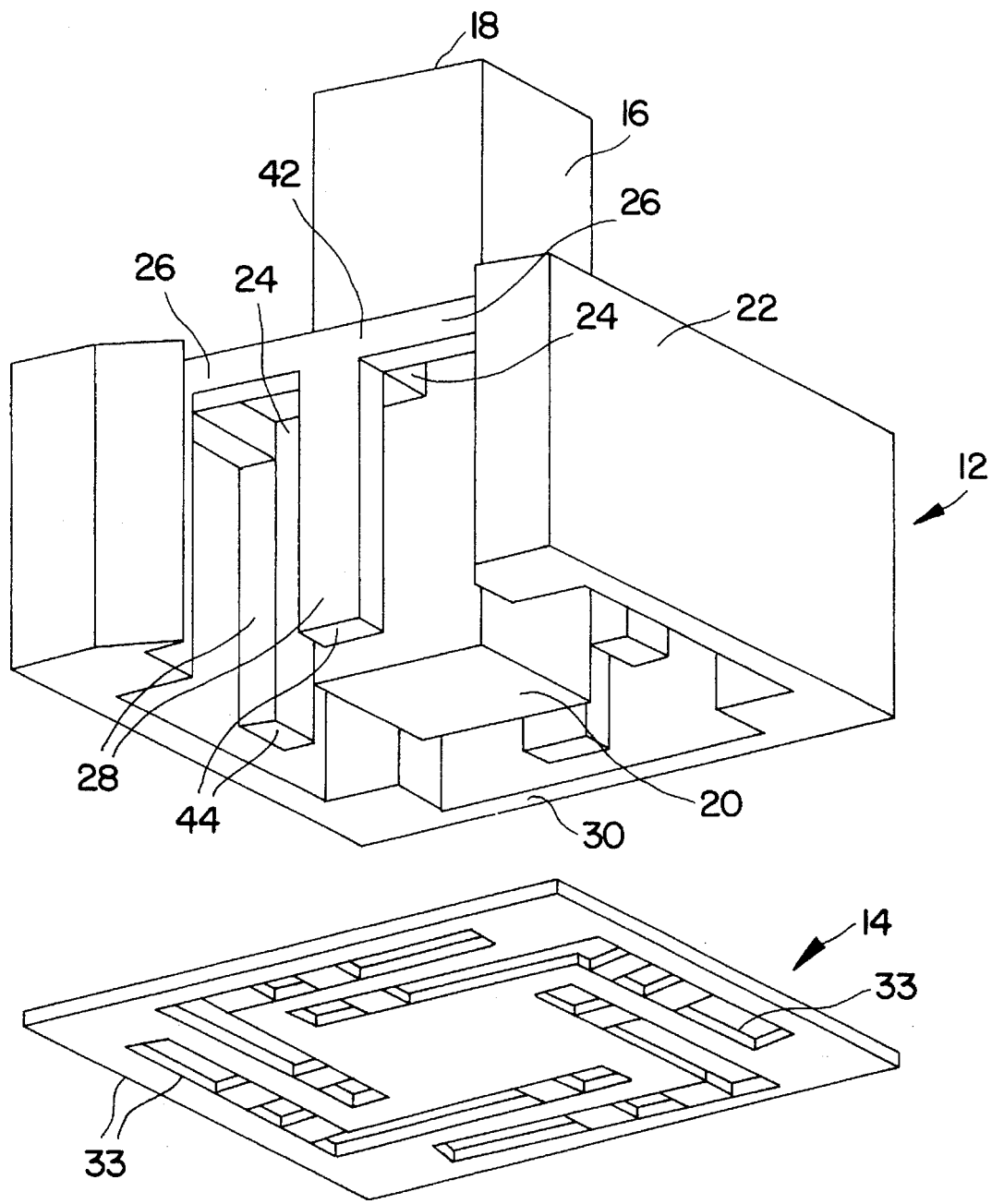
FIG. 2 is an exploded cutaway view of FIG. 1.

FIG. 1 shows a support 12 bonded to a wafer 14. FIG. 2 shows wafer 14 separated from support 12 with support 12 partially cut away to display details of the construction. Support 12 has a central column 16 with a top end 18 and a free bottom end 20. A rectangular frame 22 surrounds column 16. The column 16 is joined to the upper end of the frame 22 by four radial spokes 24 (two spokes 24 are shown in FIG. 2 and three are shown in FIG. 1) and eight links 26 (seven links are shown in FIG. 1).

As shown in FIG. 1, an end of each spoke 24 is joined to an end of two links 26 and the other ends of the links are joined to respective corners of the frame 22.

FIG. 2, shows the support 12 with a portion of the frame 22 cut away to show a complete one of four axial support beams 28, each beam 28 having one end 42 joined to an end of a spoke 24 and two links 26 at location 42.

This construction confers a high degree of flexibility for supporting column 16 on frame 22.

As shown in FIG. 1, the axis of the central column 16 is the Z axis and the X and Y axes are aligned to the radial spokes 24. The origin of the coordinates X, Y, and Z is at a location in the center of the wafer 14.

The exploded view of FIG. 2 shows a wafer (substrate) 14 facing the bottom surface of support 12 in position for bonding to the bottom ends of levers 28, frame 22 and column 16. The wafer 14 has four aperture patterns with openings extending all the way through the wafer 14.

Figure 3:
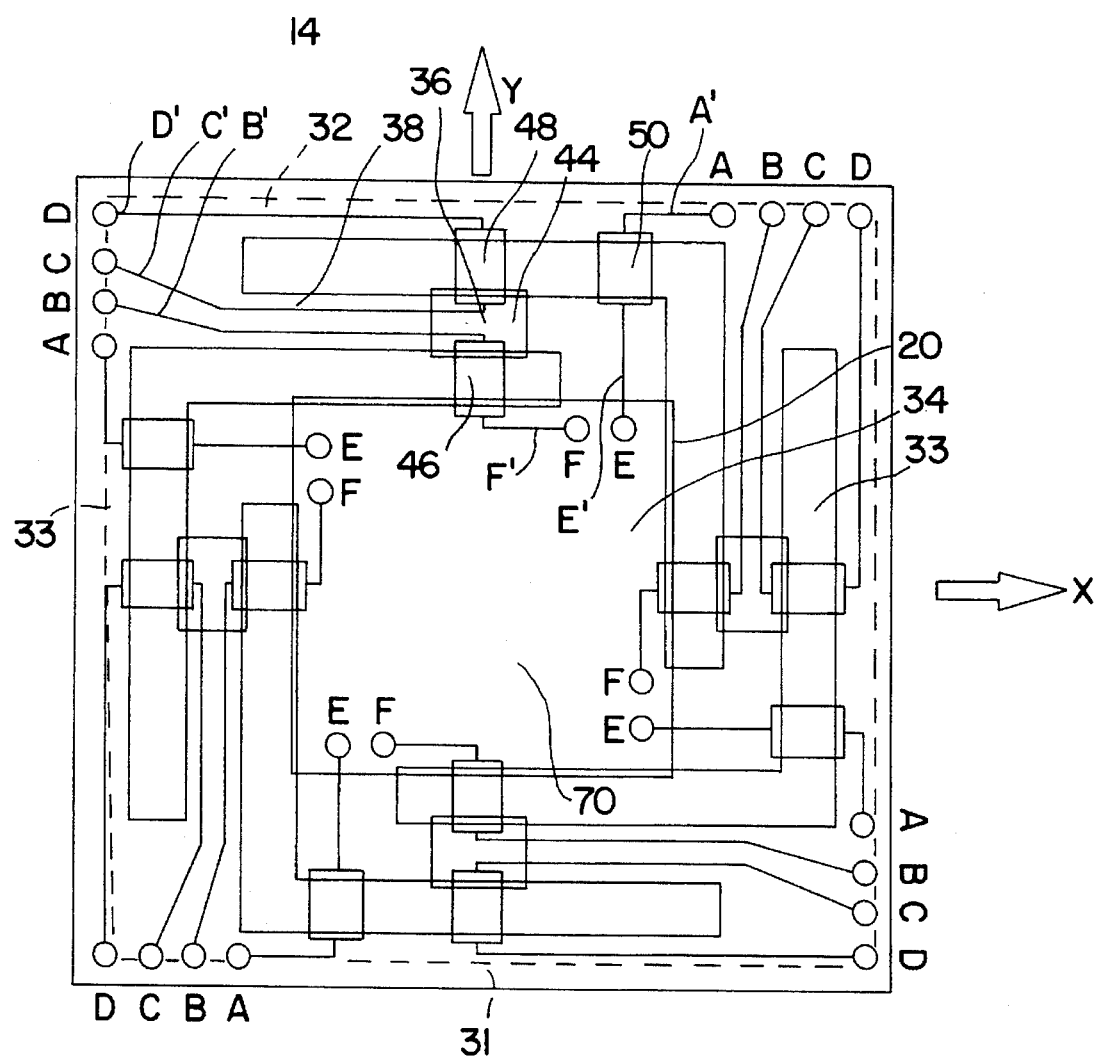
FIG. 3 shows details of the sensor layout.

FIG. 3 shows a plan view of the pattern of openings and sensors spanning the openings. Each one of the four patterns is an L shaped aperture 33. The four patterns 33 are shown arranged in quadrature on the wafer 14. The L-shaped apertures 33 define three areas connected compliantly: ring area 32 which aligns with the bottom surface 30 of frame 22, beam area 38 which aligns with the bottom surface 44 of levers 28, and center area 34 which aligns with the bottom surface 20 of central column 16. Each of the four aperture openings is bridged by a set of sensors 46, 48 and 50.

Sensors 46 and 48 extend from beam 38 in alignment with the X or Y axis to areas 34 and 32 respectively Sensors 50 extend from areas 32 to area 34 adjacent the corner of center column 16. FIG. 3 also shows each sensor, 46, 48, 50 having each end connected to one of terminals, A, B C, D, E or F respectively by conductors A', B', C', D', E', and F'. These terminals are access points for connecting processing electronics.

In one embodiment of this invention as shown in FIG. 1, the wafer 14 is composed of two layers, a structural layer 13 and a sensor layer 15. This embodiment has two versions. One version is referred to as a large force gage and is generally the version used to construct gages that have dimensions large enough to accommodate commercially available foil or semiconductor sensors. The second version is referred to as as a micro force gage and is generally the version used to construct a gage having a largest dimension smaller than 3 millimeter.

For a large force gage, the structural base 13 is made as a thin sheet metal plate such as aluminum or stainless steel formed by punching or EDM techniques. The sensor layer 15 comprises standard foil or semiconductor sensors bonded to the structural layer 13 as shown in FIG. 3 and wired to terminal taps as shown.

For a micro force gage the wafer 14 is fabricated according to well known integrated circuit techniques. See, for example, Wilner U.S. Pat. No. 4,498,229, especially col. 4, which is hereby incorporated into this specification by reference. In the preferred embodiment, the substrate 13 of wafer 14 is n type silicon and both the sensors, 46, 48, and 50 and the conductors A', B', C', D', E', F', are heavily doped with Boron to convert these regions to p type in layer 15.

The L shaped aperture patterns confer increased flexibility in the plane of and normal to the surface of the wafer 14 when the wafer 14, bonded to the support 12 and column 16 as described above, is subject to forces and moments exerted between the frame 22 and central column 16 of the support 12. The flexibility of the wafer 14 conferred by the aperture pattern increases the response of the sensors (change of resistance) induced by the forces and moment applied to the support 12 because the more flexible substrate support permits greater strain to take place in the strain sensitive resistors 46, 48, 50.

Figure 5:
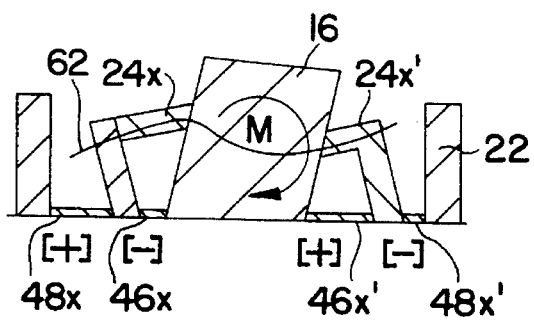
FIG. 5 shows deformation of the gage from an applied moment.
Figure 6:
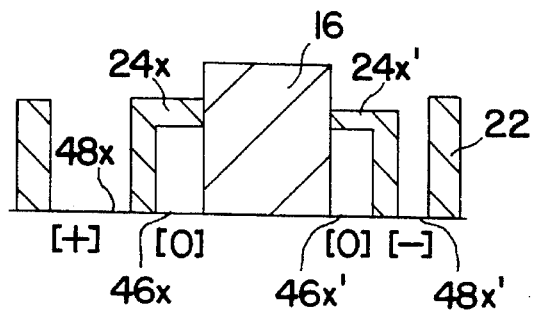
FIG. 6 shows deformation of the gage from applied force $F_x$.
Figure 7:
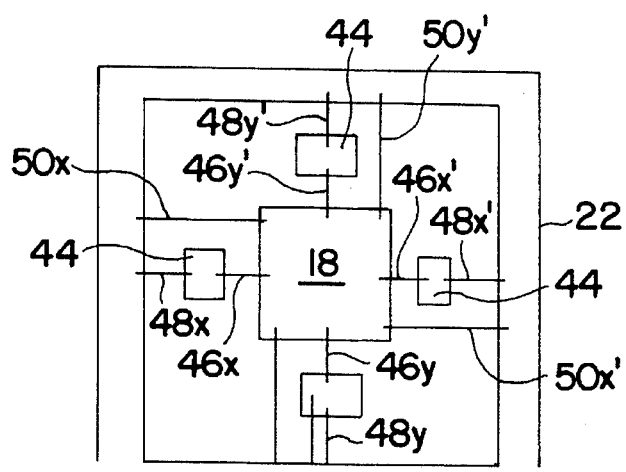
FIG. 7 shows the sensor layout.

The response of the sensors to applied forces is illustrated by FIGS. 4–7. FIG. 7 shows the arrangement of the sensors 46, 48, 50, in relation to the bottom surface 20 of central column 16, the bottom surfaces 44 of the levers 28 and the bottom surfaces 30 of the frame. Because of the symmetry about the X and Y axes, the mode of operation of the gage in the X direction is identical to that in the Y direction. The description will address the response of the different strain elements to each of the six possible load components.

Figure 4:
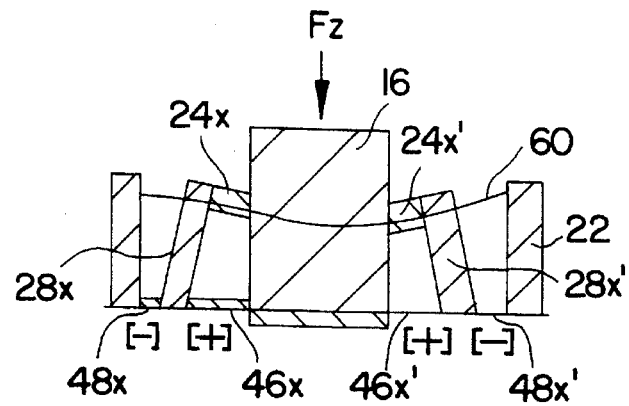
FIG. 4 is a cross ectional view illustrating devormation under $F_z$.

FIG. 4 is a sectional view showing the structure when deformed by an axial force $F_z$ acting in the negative Z-direction. When an axial force $-F_z$ is exerted in the negative Z-direction, the radial spokes 24 are deformed by bending and links 26 (links not shown in FIG. 4 but shown in FIG. 1) are twisted symmetrically forcing levers 28 to spread apart at their bottom ends 44, thereby compressing sensors $48_x$ and $48_x{}'$ and stretching sensors $46_x$ and $46_x{}'$ in the X direction. The deformation mode of the structure is represented by the symmetric elastic line 60. Similarly, levers $28_y$ and $28'_y$ (not shown in FIG. 4) are spread apart, so that sensors $48_y$ and $48'_y$ are compressed, and sensors $46_y$ and $46'_y$ are stretched in the Y direction. Sensors 46 and 48 are the primary sensors for measuring $F_z$ though the sensors such as sensor 50 may experience minor deformations due to possible geometric inaccuracies.

FIG. 5 shows the reaction of the sensor when deformed by a moment $M_y$. The deformation is represented by the antisymmetric elastic line 62. The spokes $24_x$ and $24_x'$ are deformed by bending and links 26 (not shown) are twisted nonsymmetrically causing lever $28_x$ to approach and lever $28_x'$ to depart from central column 16. This results in compressing sensors $46_x$ and $48'_x$ and stretching sensors $48_x$ and $46'_x$. Similarly, for a moment Mx sensors $46_y$ and $48'_y$ are compressed and sensors 48y and $46'_y$ are stretched. To a smaller degree, sensors $50_x$, $50_x'$ are strained by $M_y$ and sensors $50_y$ and $50_y'$ are strained by $M_x$. Sensors 50 secondary sensors for $M_x$ and $M_y$.

FIG. 6 shows the deformation of the gage when a force $F_x$ acting in the X direction is applied. Straps $26_y$ (not shown in FIG. 6) connecting spokes $24_x$ and $24'_x$ are deformed by bending and spokes $24_y$ and $24_y'$ are deformed by shear causing the central column and levers $28_x$ and $28'_x$ to approach the support frame 22 in the X direction. Sensors $48_x$ and $50_x$ are stretched and sensors $48_x'$ and $50'_x$ are compressed. Other sensors may experience minor deformations. Similarly, a force in the Y direction, $F_y$, causes sensors $48_y$ and $50_y$ to stretch and sensors $48_y'$ and $50_y'$ to compress.

FIG. 7 shows sensors 50 attached to the bottom surface 20 of central column 16 in a rotational arrangement to react tangentially to the rotation of central column 16. When central column 16 is deflected rotationally by a moment $M_z$ relative to frame 22, sensors 50 are strained similarly either in compression (counterclockwise rotation) or tension (clockwise rotation).

Table I is a summary of the primary sensors reacting to the corresponding load component and whether they sense positive (+) or negative (−) strains for a corresponding load or (s) indicates a possible secondary effect of appreciable magnitude. Other sensors may still experience minor strains due to geometric inaccuracies.

TABLE I

| LOAD | $46_x$ | $46_x'$ | $48_x$ | $48_x'$ | $50_x$ | $50_x'$ | $46_y$ | $46_y'$ | $48_y$ | $48_y'$ | $50_y$ | $50_y'$ |
|---|---|---|---|---|---|---|---|---|---|---|---|---|
| $F_x$ | | | + | − | + | − | | | | | | |
| $F_y$ | | | | | | | | | + | − | + | − |
| $F_z$ | − | − | + | + | S | S | − | − | + | + | S | S |
| $M_x$ | | | | | | | − | + | + | − | S | S |
| $M_y$ | − | + | + | − | S | S | | | | | | |
| $M_z$ | | | | | + | + | | | | | + | + |

To a first approximation, the response of the sensors can be related to the load as:

$$F = C \times G \quad (1.)$$

where G is a 12×1 vector matrix representing the output of all 12 gages., $G_1, - - - G_{12}$).

C is a 6×12 matrix of proportionality constants $C_{ij}$ relating the gages' output to the force components.

F is a 6×1 force vector. i.e., $F = \{F_x, F_y, F_z, M_x, M_y, M_z\}^T$

The strain indicated by the sensors may be measured by a conventional wheatstone bridge circuit arrangement.

It is an embodiment of this invention that all of the processing electronics may be formed on the surface of the chip 14 such as in areas 70 shown in FIG. 3 using well known techniques for fabricating integrated circuits. Therefore the sensors and circuit can be formed in the same manufacturing operation.

The six component force gage of which the foregoing description is an embodiment meets the objects of the invention.

A support structure has been described which translates forces applied in any one of three orthogonal directions into a planar direction. This feature permits use of integrated circuit manufacturing technology to form a plurality of sensors and associated circuitry on one surface of a semiconductor wafer.

The support structure 12 can be conveniently machined as a small part by EDM techniques or in a larger size by a milling operation.

Variations and modifications of the invention may be considered which are within the scope of the invention. For example, the use of twelve sensors to sense any one of three force components and three moment components provides a great degree of sensitivity. However, it will be understood that the advantages of the free end support beam construction are also realized if the number of piezoresistors is reduced such as elimination of sensors 48 or the use of only two sensors 50.

It will also be understood that the principles of the invention may be applied to the case where a different number of sets of spokes, support beams and sensors are arranged (for example, a triangle, hexagon, etc.) rather than the rectangular arrangement of the above example. However, a minimum of three radial arms and support beams is necessary to sense the six components of generalized force.

In view of these and other modifications, I define the scope of my invention by the appended claims and in view of the specification if need be.

What is claimed is:

1. A gage adapted for measuring displacement between a first body and a second body which comprises:

at least one support beam having a supported end and a free end;

means adapted for securing said supported end to said first body and to said second body such that when said first body is displaced from said second body, said free end is displaced from an initial position;

at least one strain sensitive first sensor means, one said first sensor means for each said at least one support beam, for eliciting a signal responsive to displacement of said free end of said respective support beam from said initial position wherein said first sensor means has a first end secured to said free end of said respective support beam;

said first sensor means having means adapted for attaching a second end of said first sensor means to one of said first body and said second body.

2. The gage of claim 1 wherein said means for securing said supported end comprises:

a central column having a first column end adapted for attachment to said first body and a second column end;

a frame member surrounding said central column and adapted for attachment to said second body;

one spoke for each said at least one support beam;

each said spoke having one end attached to said central column and extending away from said central column and another end attached to said supported end of said respective support beam;

at least one strap for each said support end, each said strap having one end secured to said respective support end and another end secured to said frame.

3. The gage of claim 2 which comprises:

at least one strain sensitive second sensor means having one end secured to said central column and another end secured to said frame arranged for sensing rotation of said central column with respect to said frame and for sensing linear displacement of said central column with respect to said frame.

4. The gage of claim 2 wherein each one of said at least one first sensor means comprises a strain sensing member having another end attached to said central column.

5. The gage of claim 2 wherein each one of said at least one first sensor means comprises a strain sensitive resistor having another end attached to said frame.

6. The gage of claim 2 wherein each one of said at least one first sensor means comprises two strain sensing elements, one said sensing element having one end secured to said free end of said support beam and another end secured to said frame and another sensing element having one end secured to said free end of said support frame and another end secured to said central column.

7. The gage of claim 6 which comprises at least one strain sensitive second sensor means having one end secured to said central column and another end secured to said frame arranged for sensing rotation of said central column with respect to said frame and for sensing linear displacement of said central column with respect to said frame.

8. The gage of claim 7 wherein said at least one first sensor means comprises four first sensor means, arranged at quadrature locations around said central column such that signals from first and second sensor means are enabled to indicate a force applied in any direction and a moment oriented in any direction between said first and second bodies.

9. The gage of claim 2 which comprises:

a semiconductor substrate having a surface with a first area secured to said frame and a second area secured to said central column and a third area secured to said free end of each one of said at least one support beam;

each one of said at least one first sensor means being a piezoresistor deposited on said surface of said semiconductor and having one end proximal to said third area and another end proximal to one of said first area and said second area.

10. The gage of claim 3 wherein said gage comprises a semiconductor substrate having one area attached to said central column and another area attached to said frame and each one of said at least one second sensor means is at least one piezoresistor supported on said substrate and having one end proximal to said one area of said semiconductor and another end proximal to said another area of said semiconductor.

11. The gage of claim 9 wherein said piezoresistor bridges over a slot in said substrate.

12. The gage of claim 10 wherein said piezoresistor bridges over a slot in said substrate.

13. The gage of claim 9 wherein said semiconductor substrate is one of:

(i) n doped silicon and said piezo resistor is p doped silicon.

(ii) p doped silicon and said piezo resistor is n doped silicon.

14. The gage of claim 10 wherein said semiconductor substrate is one of:

(i) n doped silicon and said piezo resistor is p doped silicon.

(ii) p doped silicon and said piezo resistor is n doped silicon.

15. The gage of claim 2 wherein said at least one support beam is four support beams and said frame is a rectangle, each side of said rectangle facing a respective one of said spokes.

16. The gage of claim 2 wherein said central column has an end with a threaded hole adapted for bolting to said first body.

17. The gage of claim 1 wherein said strain sensitive first sensor means comprises a wire.

18. The gage of claim 3 wherein said strain sensitive second sensor means comprises a wire.

19. A method for measuring force and moment between a first and a second body which includes the steps:

(a) attaching said first body to a gage and attaching said second body to said gage wherein said gage comprises:

(i) at least one support beam having a supported end and a free end;

(ii) means adapted for securing said supported end to said first body and to said second body such that when said first body is displaced from said second body, said free end is displaced from an initial position;

(iii) one strain sensitive first sensor means for each said at least one support beam, for eliciting a signal responsive to displacement of said free end of said respective support beam wherein said first sensor means has one end secured to said free end of said respective support beam and a second end secured to a means adapted for connecting said second end of said first sensor means to one of said first body and said second body;

(iv) means adapted for eliciting a signal responsive to strain in said first sensor means;

(b) applying said force and moment between said first and second body such as to strain said first sensor means and elicit a signal indicative of said force and moment.

20. The method of claim 19 wherein said gage comprises:

(i) at least one strain sensitive second sensor means;

(ii) means adapted for attaching a first end of said second sensor means to said first body;

(iii) means adapted for attaching a second end of said second sensor means to said second body;

(iv) means adapted for eliciting a signal responsive to strain in said second sensor means and said method includes in step (b) applying at least one of said force and moment between said first and second body such as to strain said second sensor means and elicit a signal from said second signal eliciting means.

21. The method of claim 20 wherein said first and second sensor means, first and second signal eliciting means, at least one support beam means, means for securing said supported end are arranged in operable combination with one another such that said signal eliciting means elicits a signal in response to at least one of force and moment applied in an arbitrary direction between said first and second body and said step (b) includes the step of applying said at least one of said force and moment in an arbitrary direction.

22. A method for measuring components of a generalized force acting between two bodies by converting said force to a set of co-planar strains which includes in operable order the steps:

(a) providing a structure having a plurality of strain elements, said structure being elastically responsive to said generalized force when said structure is connected to said first and second bodies and said generalized force is applied between said first and second bodies;

(b) providing a plurality of support beams, each support beam having a supported end and a free end wherein all of said free ends are aligned in a plane;

(c) attaching said supported end of each support beam to at least one strain element of said plurality of strain elements such that when a strain is induced in any one of said at least one strain element, said induced strain displaces said second end of said respective support beam relative to said structure;

(d) bonding a strain sensitive wafer to each one of said free ends and to said structure;

(e) attaching to said wafer a means for indicating a plurality of signals responsive to strains induced in said strain elements;

(f) attaching said structure to said first and second bodies and permitting said generalized force to act between said first and second bodies;

(g) processing signals emitted by said means for emitting signals such as to obtain measurements of components of said generalized force.

23. The method of claim 22 wherein said strain sensitive wafer includes signal processing microelectronic circuitry.

* * * * *